United States Patent [19]

Lo et al.

[11] Patent Number: 5,020,113
[45] Date of Patent: May 28, 1991

[54] MASKABLE BILEVEL CORRELATORS

[75] Inventors: Thomas K. Lo, Temple City; Jack M. Sacks, Thousand Oaks; Wayne P. Simoni; Leonard A. Lee, both of Canoga Park; Harrison Nguyen, Ontario; Lynne M. Karlin, Northridge; Andy L. Quan; Kazuo R. Hosokawa, both of Canogo Park, all of Calif.

[73] Assignee: Hughes Aircraft Company, Los Angeles, Calif.

[21] Appl. No.: 229,407

[22] Filed: Aug. 8, 1988

[51] Int. Cl.⁵ .............................................. G06K 9/64
[52] U.S. Cl. ................................. 382/42; 364/728.03; 364/819; 382/33
[58] Field of Search ........................... 382/42, 32, 33; 364/728.03, 728.05, 819, 820, 822

[56] References Cited

U.S. PATENT DOCUMENTS

| | | | |
|---|---|---|---|
| 3,597,083 | 8/1971 | Fraser | 356/2 |
| 4,244,029 | 1/1981 | Hoyan et al. | 382/42 |
| 4,475,238 | 10/1984 | Everhart | 382/42 |
| 4,622,595 | 11/1986 | Histake et al. | 358/457 |
| 4,706,296 | 11/1987 | Pedotti et al. | 382/42 |
| 4,750,144 | 6/1988 | Wilcox | 364/728.03 |
| 4,864,629 | 9/1989 | Deering | 382/42 |
| 4,866,534 | 9/1989 | Tada | 382/42 |

FOREIGN PATENT DOCUMENTS

0005918A1 12/1979 European Pat. Off. .

Primary Examiner—David K. Moore
Assistant Examiner—Joseph Mancuso
Attorney, Agent, or Firm—C. D. Brown; R. M. Heald; W. K. Denson-Low

[57] ABSTRACT

A method and apparatus for correlating two signals representing a live image and a reference image are disclosed. The reference signal is processed to provide a polarity bit and mask bit for each pixel position in the reference image. The processed video signal is stored in a memory 20 and used in a convolver and summer section 18 in which the polarity bits between the reference and live images are gated by gate 17 and are used in generating a correlation output from summer 23. However, the polarity bits do not affect the correlation output if the logical output from gate 19 is of a given state which occurs if the associated mask bits indicate that the gradient value at the particular pixel position does not exceed certain minimum threshold values.

18 Claims, 5 Drawing Sheets

Correct Offset
And Global
Correlation
Peak

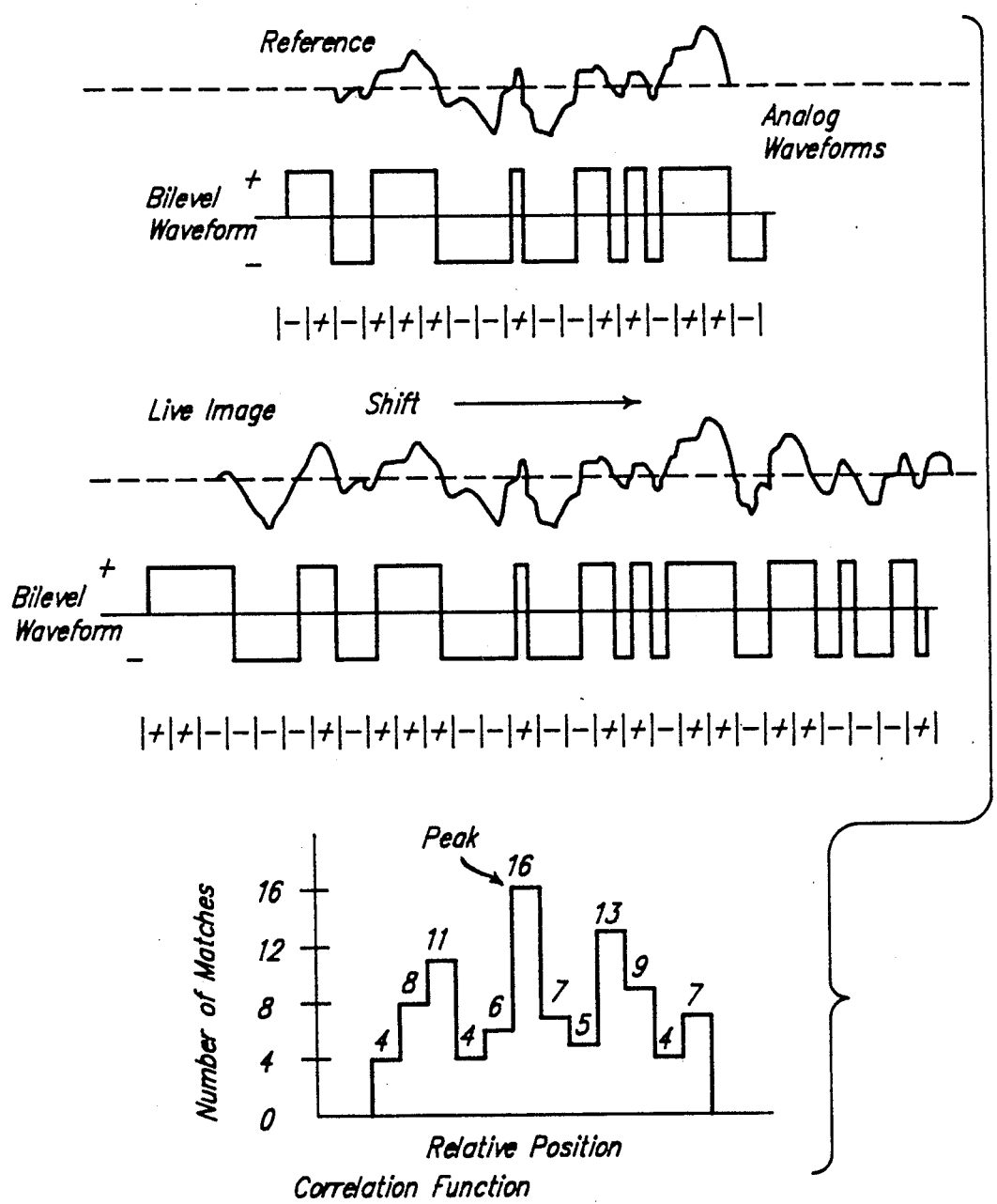
PRIOR ART 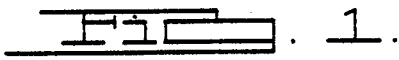

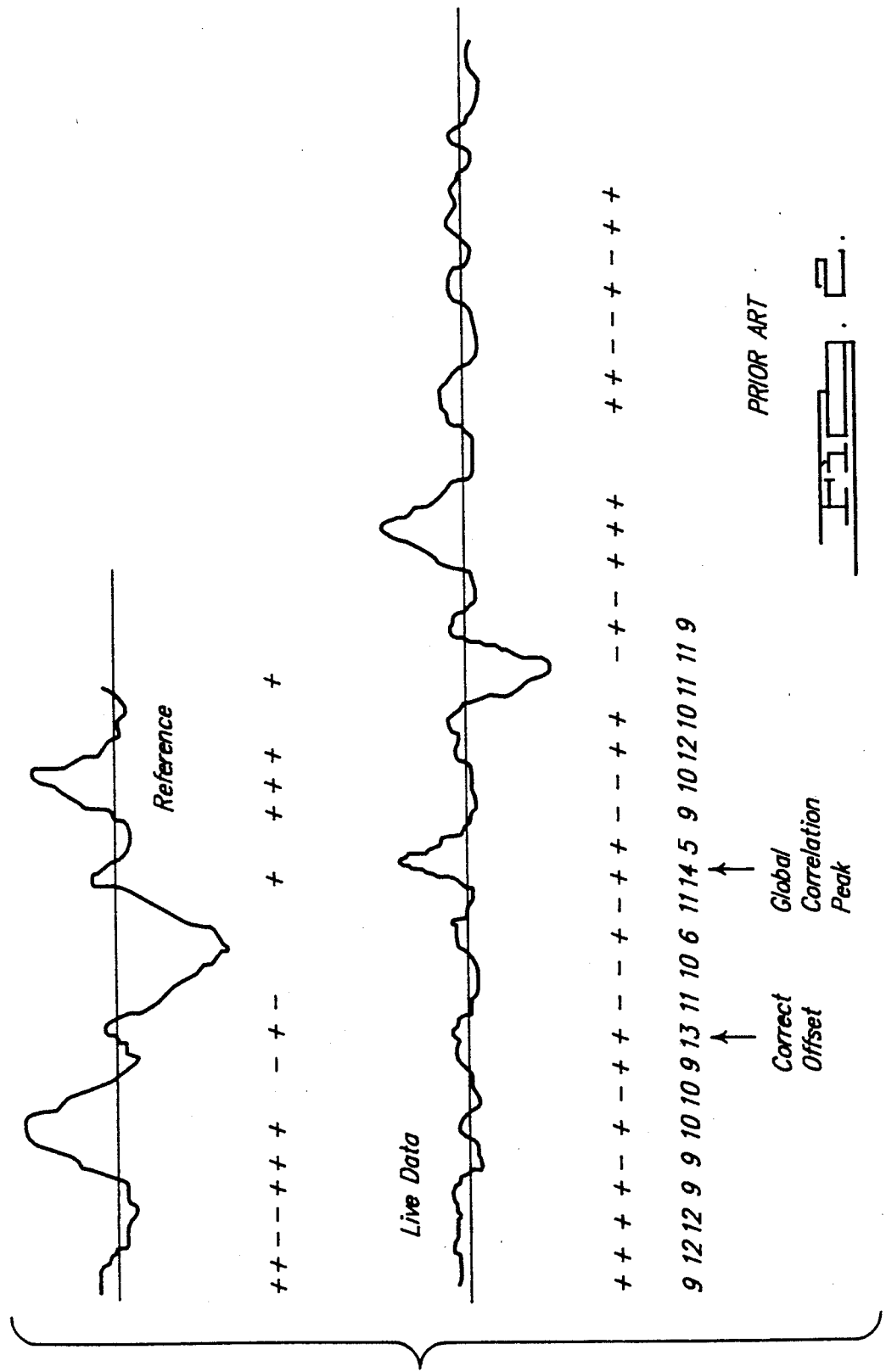

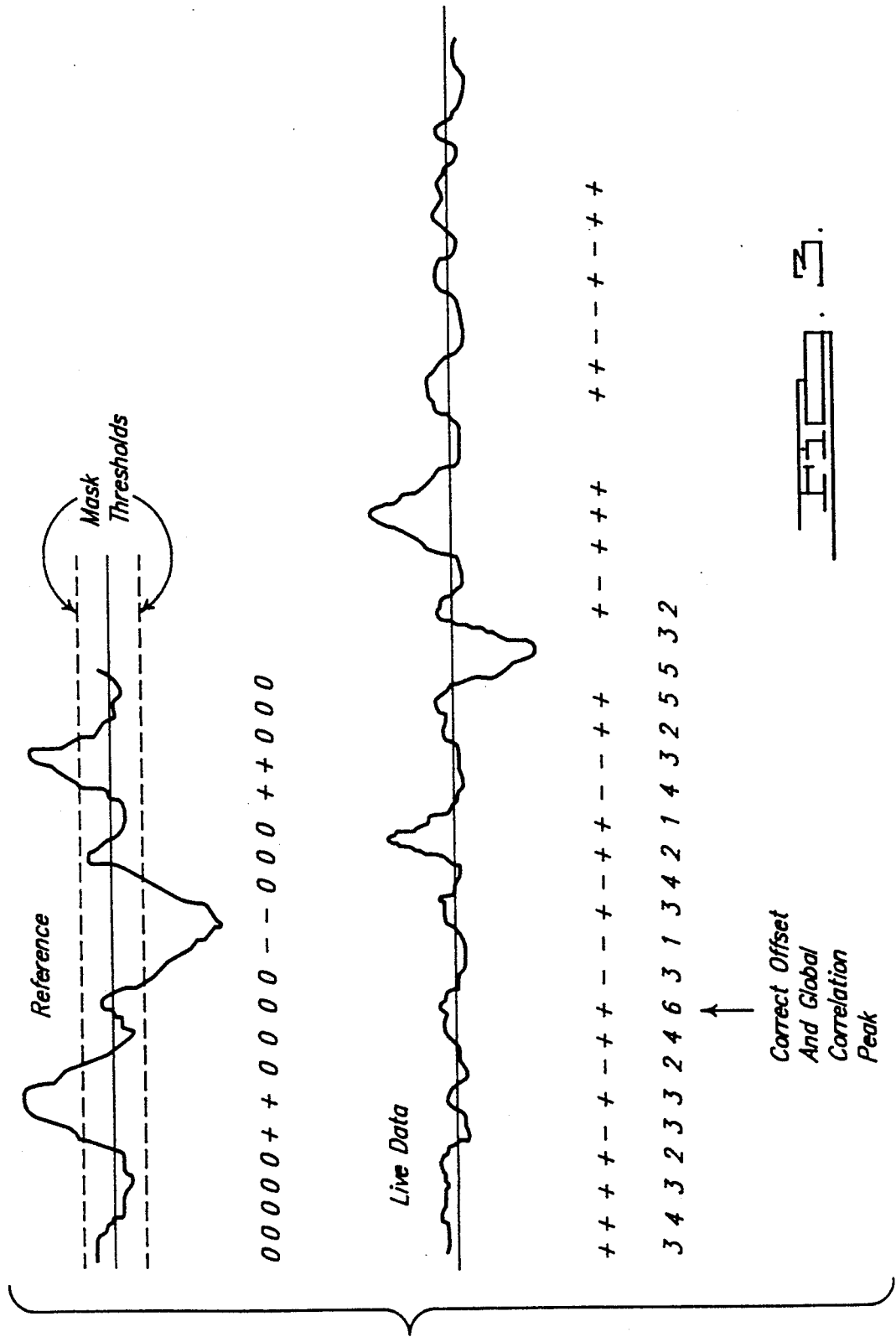

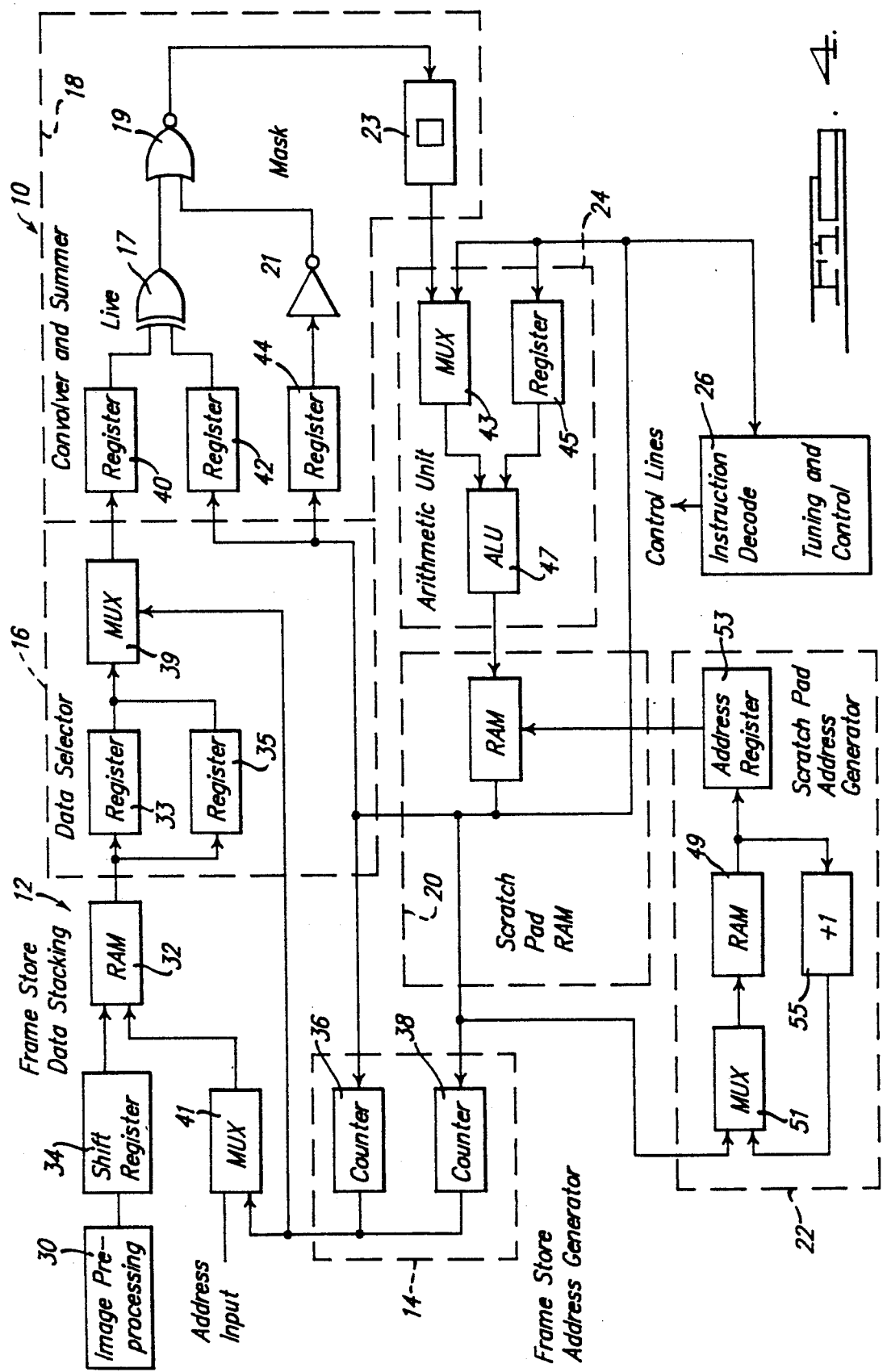

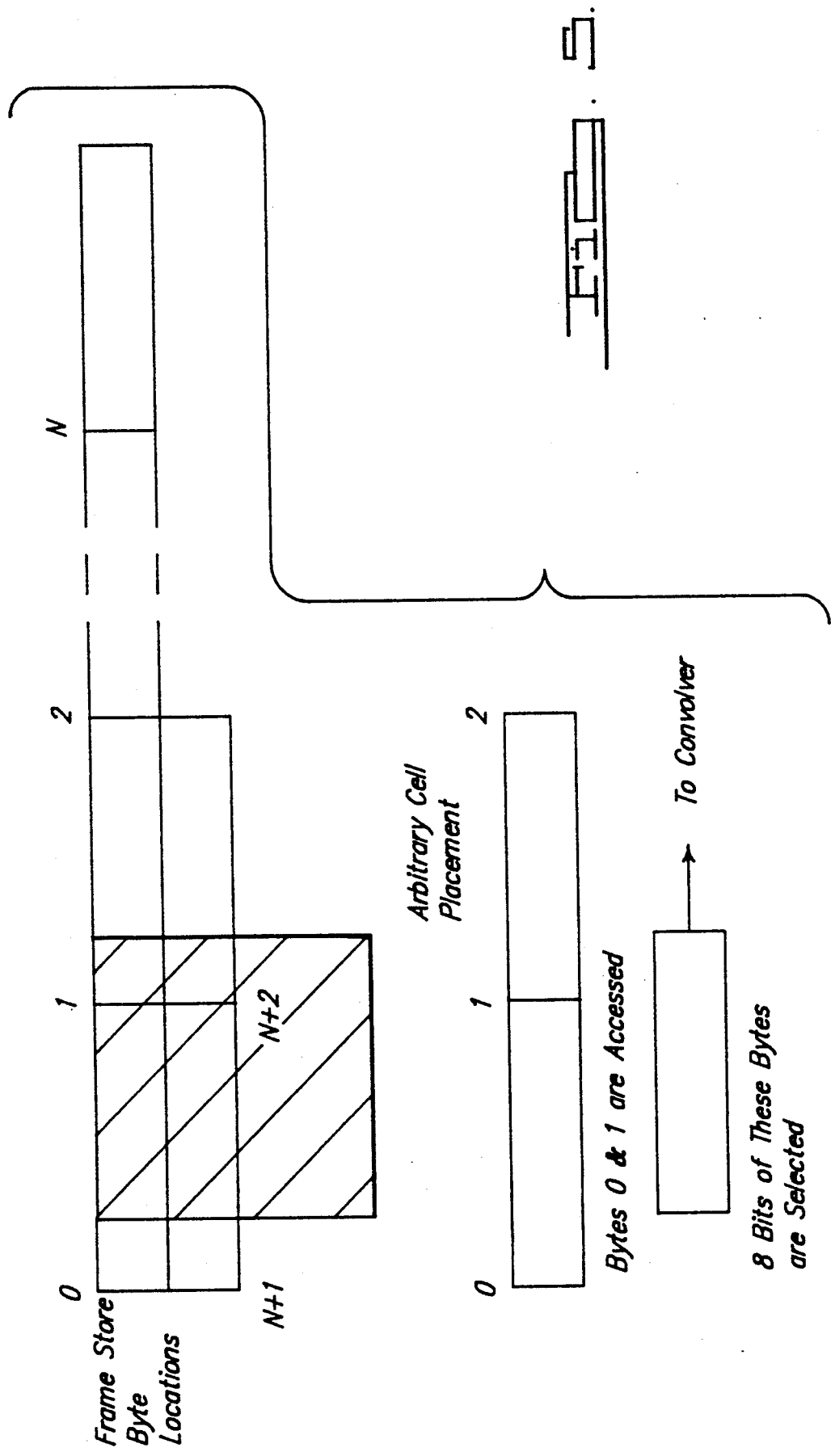

MASKABLE BILEVEL CORRELATORS

BACKGROUND OF THE INVENTION

1. Technical Field

This invention relates to image processing techniques and, more particularly, to techniques for matching patterns using area correlators.

2. Discussion

Area correlation is an important signal processing function in many image processors. Applications include trackers, pattern recognizers, scene stabilizers, and sensor line of sight (LOS) alignment. Traditionally area correlation has been implemented using either greylevel product correlation or bilevel correlation. These two techniques represent opposite extremes in the performance/complexity tradeoff.

The product correlator performs the matching function by multiplying each pixel in a reference image with a corresponding pixel in a live image and accumulating the sum of the products. In order to keep up with the sensor imaging rate (typically 60 Hz), parallel processing in hardware is usually necessary. This results in high cost, high power consumption and bulky hardware which is unsuitable for applications where the available volume is small. In addition, the large amount of multiplications also tends to limit the search range of the correlator. This means the correlator is unable to perform matching when the LOS offset between the sensors is large. This limitation makes it unsuitable for boresight alignment applications.

The bilevel correlator performs the matching function by comparing the polarity of the spatial gradient between the reference image and the live image. A gradient operator is applied to the raw greylevel image and each pixel is replaced by the polarity of its spatial gradient. The match function is computed by accumulating the number of pixel pairs in the two images with polarity coincidence. This process effectively performs the "multiplies" in the product correlator with a logical "exclusive nor" operation and results in a simplification of the hardware with a corresponding improvement in throughput. Thus, bilevel correlators can be implemented in relatively low cost and compact hardware that is suitable for applications where the available volume is small. The increased throughput also allows for increased search range which makes the correlator applicable for sensor alignment applications.

The problem with the bilevel correlator is that all pixels in the reference image are treated equally. In those pixels where the scene content is relatively uniform, the amplitude of the gradient is small and the polarity of the gradient often is dominated by noise. Statistically, the cross correlation of noisy pixels can add or detract from the correlation function with equal probability. Thus the inclusion of noisy pixels does not add to the mean peak of the correlation function but increases its variance. This effectively reduces the signal to noise ratio at the output of the correlator. In bland scenes where most of the reference image is fairly uniform, the noisy pixels can overwhelm the number of signal-occupied pixels. In this environment the bilevel correlator does not perform well.

SUMMARY OF THE INVENTION

This invention discloses a maskable bilevel correlator which retains the advantageous features of the bilevel correlator while alleviating the problems of noisy pixels. A by-product of this correlation concept is an automatic correlatable area selection technique which selects areas with a high density of signal-occupied pixels for reference areas. This feature greatly enhances correlator performance in bland scenes. Additionally, the maskable bilevel correlator provides a measure of the "clutterness" of the scene for algorithm adaptation.

According to the present invention, the signals representing the live image and reference image are differentiated and thresholded to provide a polarity bit and mask bit for each pixel position. The value of the mask bit is one digital state (off) if the amplitude of the analog signal falls between two preselected threshold levels and will be of an opposite digital state (on) if the amplitude is greater than the threshold levels. The value of the polarity bit is dependent upon on whether the amplitude of the signal is positive or negative. The polarity bits and mask bits of the resultant images are used to generate a correlation function in which the polarity bit values are ignored for those pixel positions having mask bits of the one state representing the off condition.

BRIEF DESCRIPTION OF THE DRAWINGS

The various advantages of the present invention will become apparent to one skilled in the art upon studying the following specification and by reference to the drawings in which:

FIG. 1 comprises waveforms and graphs helpful in understanding the general correlation function of the prior art;

FIG. 2 similarly consists of waveforms and associated indicia helpful in understanding problems associated with prior art correlators when the live image is relatively bland;

FIG. 3 is similar to FIG. 2 except that it illustrates the improvement provided by way of the present invention;

FIG. 4 is a functional block diagram of hardware for carrying out the teachings of the preferred embodiment of this invention; and FIG. 5 is useful in understanding the accession of correlation video from the framestores in the convolution process.

DESCRIPTION OF THE PREFERRED EMBODIMENT

Almost all correlators work on the premise that the reference image forms a subimage of a larger image called the live image. It is the function of the correlator to locate the portion of the live image which most nearly resembles the reference image. The correlator performs this function by successively superimposing the reference image on the live image with different offsets and computing a measure of similarity at each offset. The similarity measure is called the correlation function. The position of the global maximum of the correlation function yields a best estimate of the offset between the reference image and the live image.

The bilevel correlation function is developed by accumulating the number of pixels with coincident polarity between the two images as shown in FIG. 1. Note that each pixel is used in the matching process and assigned equal weight. In those pixels where the signal magnitude is smaller than the noise, the polarity assigned to the pixel is determined by the polarity of the noise. These pixels are equally likely to be positive or negative in polarity. Since the noise is independent from image to image, the noise dominated reference pixels are as likely to match or mismatch the corresponding pixels in the live image. Statistically, these pixels do not contribute to the magnitude of the correlation peak but increase the variance or the fluctuation of the peak magnitude. In bland scenes where the bulk of the reference pixels are noise dominated as shown in FIG. 2, the fluctuations of the peak magnitude can be so large relative to the mean peak that the correlation function's peak position no longer indicates the true offset between the two images.

The maskable bilevel correlator of the present invention gets around the bland scene problem in a conceptually very simple manner. It reasons that since the noise dominated pixels do not contribute toward enhancing the magnitude of the correlation peak but increases its statistical fluctuation, they degrade the correlator's ability to correlate. Therefore, they must be excluded from the correlation process. Instead of using every pixel in the reference image in the correlation process, it ignores the noise dominated pixels. It does so by computing a pair of thresholds that is placed at kσ about the mean gradient amplitude of the input scene. (k is a constant typically in the range of 1 to 2 and σ is the standard deviation of the noise in the image). Those reference image pixels with magnitude between the threshold pairs have low signal to noise ratio and are masked off. Reference image pixels with magnitudes outside of the region bounded by the threshold pair have good signal to noise ratio and are unmasked. Functionally, only unmasked pixels are used in the correlation process.

The process of masking is illustrated in FIG. 3 where a "0" designates a pixel which has been masked off. In the correlation process the masked pixels are ignored. The ignoring of the masked pixels is accomplished by designating each pixel with a mask bit and a polarity bit. The polarity bit designates the polarity of the pixel. The mask bit takes on the value "0" for masked pixels and the value "1" for unmasked pixels. In the convolution process the polarity bits are logically compared using "exclusive nor" as with the bilevel correlator. The output of the exclusive nor is a "1" for polarity coincidence and a "0" for the lack of coincidence. The output of the "exclusive nor" is then logically "ANDed" with the mask bit for the reference pixel. For a pixel with mask bit "0", the output of the "AND" function will always be a "0" independent of the polarity coincidence of the pixel pair being compared. When the mask bit is a "1", the output is a "1" when the polarities coincide. FIG. 3 illustrates the correlation function obtained with the maskable bilevel correlator using the same waveform as FIG. 2. Note that the bilevel correlation peak in FIG. 2 indicated the wrong offset whereas the maskable bilevel correlator of FIG. 3 yields the correct result. By virtue of the masking feature, the maskable bilevel correlator is able to push the operational limit of the correlator to scenes that are too bland for the bilevel correlator to work.

A second benefit of the maskable bilevel correlator is its ability to pick off portions of an image that are rich in details and hence are good reference images. The mask bit tags each pixel according to its signal to noise ratio (i.e., those with mask bit value "1" have good signal to noise ratio whereas those with value "0" have low signal to noise ratio). Correlation performance generally improves monotonically with the number of signal dominated pixels used in the reference area. For most practical correlators used for vehicle guidance the reference images are extracted from a "live" image and correlated against subsequent images in a bootstrap manner. The size of reference cell areas is small compared to the dimensions of the live image from which it is extracted. Typically the reference image may be 1% to 2% of the size of the live image. Thus there is a degree of freedom in terms of where the live image is scanned by the reference cell. At each pixel the density of unmasked pixels is computed and stored in a RAM. Locations with the highest unmasked pixel density represent good reference areas.

A third usage of the maskable bilevel correlator is the determination of "clutterness" of the scene for use in multimode signal processors. In many applications the signal processing algorithm is adaptive on the basis of scene content. The number of unmasked pixels in the image provides a measure of the "clutterness" of the scene. A high density of unmasked pixels globally indicates that the scene has a high density of large spatial gradients. This condition implies that the scene is spatially inhomogeneous with large variations in intensity and is therefore "cluttered". It also indicates the scene is highly correlatable. This knowledge of scene "clutterness" can be used as an input for the adaptive selection of signal processing algorithms.

The maskable bilevel correlator method of this invention can be implemented in hardware in many ways. The selection described here was chosen to yield maximum flexibility in current system applications.

One such correlator system 10 is shown in FIG. 4. It consists of the framestore and data stacking network 12, the frame store address generator 14, the data selector 16, the convolver and summer 18, the scratch pad RAM 20, the scratch pad address generator 22, the arithmetical unit 24, and timing and control circuits 26. The functions of these subsystems are described below.

The heart of the correlator is the bit comparison function (convolver) 18. This function had been previously described as an EXCLUSIVE-NOR of the live and reference images followed by the 'AND' of this term with the mask bit of the reference image. Using DeMorgan's theorem, any of the inputs coupled with the EXCLUSIVE-NOR and 'AND' function may be changed to other combinations of logical elements to yield identical outputs. This change of logical elements allows us to take advantage of the technology available today. The mechanization selected for the breadboard system with the 'EXCLUSIVE-OR' of the live and reference images via gate 17 followed by the 'NOR' of this term with the mask bit of the reference inverted via gate 19 and inverter 21. The output of this circuit yields the same results as the method described earlier, a '1' if the live and reference matched in polarity with the reference unmasked and a '0' otherwise.

A single bit comparison, while hardware frugal, limits the ability of the convolver to correlate large references with large search ranges due to time constraints. In our case, operation is at 60 Hz with multiple references. To accomplish the higher throughput, the reference is divided into cells containing 8 pixels horizontally and 8 lines vertically (covering 64 pixel locations in area). The eight by eight format was chosen to make use of the by 8-bit data width of available RAM memory devices. The bit convolver is expanded to accept 64 live pixels, 64 reference pixels and 64 mask bits.

Video from preprocessing circuit 30 is comprised of a polarity bit and a mask bit which has been assigned to each pixel position according to the aforementioned differentiating and thresholding process. Briefly, the preprocessing circuit 30 includes suitable means such as known analog to digital (A/D) converters to digitize the raw analog signal from the sensor into a digital greylevel image. A gradient processor operates on this digital greylevel image to generate a gradient image where each pixel value is a function of the spatial gradient or difference between neighboring pixel values. The present invention preferably operates on such gradient images to generate the polarity and mask bits for each pixel position. If the gradient signal value at a given pixel position is above or below a positive or negative threshold $k\sigma$, respectively, the mask bit is assigned a digital one value. Otherwise, the mask bit is given a digital zero value for that pixel position. The polarity bit is a function of the polarity of the amplitude of the gradient signal at a given pixel position. If the amplitude is positive then the polarity bit will be assigned a digital value of one whereas if the gradient signal value is negative, the polarity bit at this pixel position will be assigned a digital value of zero. In this embodiment, the reference image is derived by undergoing this differentiation and thresholding process and storing the resultant data in the scratch pad RAM 20 where it can be later compared to live images consisting of subsequently similarly generated image data.

The similarly preprocessed "live" signal (mask plus polarity) is stored in a framestore RAM 32 via shift register 34. A framestore is used to capture the image so that multiple cells may be convolved throughout the image with one convolver in a time sequenced manner. Real time convolution of video without the framestore would generally require one convolver for each cell within the reference or would require a single convolver with nonoverlapped reference search locations. A dual framestore is used in a ping-pong fashion to yield real time operation. One set of framestore memories is being loaded by the preprocessor 30 while the second set is used by the correlator 10. Shift register 34 at the input to the framestore RAM 32 is used to stack the data into 8-bit words for parallel access by the convolver.

The correlator 10 extracts data from the framestore RAM 32 with addresses output by the framestore address generator 14 and passes that data through selector 16. The address generator 14 is comprised of an X and Y address (via counters 36 and 38, respectively) representing the horizontal and vertical direction of scan of the references. The address in the X axis is a 'bit location', the lower three address lines are used by the data selector to align the input data to the convolver. The Y address is the video line location. Two consecutive 8-bit data words are accessed then mixed to align them to the proper bit location. FIG. 5 shows the process functionally.

The data selector 16 is comprised of two registers 33 and 35 and a mux selector circuit 39. As shown in FIG. 5 the selector 16 requires two accesses to the framestore to obtain one 8 bit byte which is then output to the convolver. On the first access to the framestore, the 8 bit data is saved in register 33. The data from the second access is saved in register 35. The two registers hold the data stable while the selector mux 39 aligns them to the proper bit locations. During this time the next access is initiated to the framestore.

Mux 41 is used to control the ping-pong framestores RAM 32. There is one set of multiplexers for each of the two memories that comprise the framestore. The multiplexers select which addresses and control lines are input to each of the framestore memories. During any single field of video, mux 41 will select the framestore address generator 14 to one of the framestore memories and the video address input to the other. This will alternate each field yielding the required ping-pong operation of the framestore memory.

The 8 bits of data selected from the framestore RAM 32 are input to the convolver's live storage registers. This is mechanized as eight 8-bit shift registers (one of which is shown labelled as 40). These registers are used to stack the input data into the 8×8 format of a cell and present the 64 pixels to the convolver. This section also includes a 64-bit reference register 42 and a 64-bit mask register 44 each loaded from the scratch pad RAM 46 as four 16-bit words. These three 64-bit registers are the input to the convolver bit comparisons. The 64-bit comparisons are accomplished by the convolver gates 17 and 19 as indicated above. A summing network 23 follows the convolver to add the number of matches (1's) from the bit comparison and provide an output which is a function of the correlation between the thresholded live and reference images. In particular, the summer 23 will peak when the live image is correlated with the reference image (see, e.g., FIG. 1).

The convolver summing network feeds the arithmetic unit 24 which includes multiplexer 43, register 45, and arithmetic logic unit 47. The arithmetic unit is used to accumulate correlation surfaces, accumulate unmasked pixel surfaces and add or subtract partial correlation surfaces.

The scratch pad RAM 20 is the storage location for all variables and data required by the correlation hardware. These data are defined as follows:
1. Reference storage — multiple 8×8 reference cells are packed into consecutive memory locations.
2. Mask storage — multiple 8×8 mask cells corresponding to each of the references are stored in the same format as their associated references.
3. Surface store — two dimensional arrays of convolution sums representing the correlation surface of a cell or multiple cells.
4. Correlatable regions — two dimensional arrays representing the sum of unmasked pixels at each possible reference location.
5. Instruction store — instruction list and constants defining the sequence of operation of the correlator, number of cells, cell placement, search ranges and address pointing to data storage areas.

The scratch pad address generator 22 includes RAM memory 49, multiplexer 51, address register 53, and incrementer 55. The address generator is responsible for maintaining current addresses for all processes presently taking place in the correlator. RAM 49 is 16×16 word storage devices which contains address pointers to scratch pad memory locations. RAM 49 data is as follows:
 0 — Program counter
 1 — Convolve enable table address
 2 — Peak table address
 3 — Search size table address
 4 — Cell location table address
 5 — Cell masks address
 6 — Cell references address
 7— Accumulated mask sum table address
 8 — Surface table address
 9 — Refresh enable table address
 10 — Refresh table address
 11 — Temporary address 12 — Temporary address
13 — Temporary address
14 — Temporary address
15 — Temporary address The first location in RAM 49 is the address to the next instruction to be executed by the correlator. Locations 1 through 10 contain the addresses to the required information used during a correlation instruction. These addresses are incremented by incrementer 55 so they always point to the next address location for valid data. Locations 11–15 are used as temporary address locations by the data manipulation instructions for adding, subtracting, moving or clearing correlation surface data. Mux 51 selects the data to be input to RAM 49. When updating the RAM for a new correlation, Mux 51 selects data from the scratch pad RAM 20. While executing the correlation instruction, mux 51 selects the data from incrementer 55 for local updating of parameter addresses. Address register 53 maintains a stable address to the scratch pad RAM 20 while RAM 49 is updated with the newly incremented value from incrementer 55.

Automatic correlatable area selection is accomplished by accumulating a surface which is comprised of the number of unmasked pixels at any cell or region location in the field. A large number of unmasked pixel corresponds to an area rich with spatial gradients. A peak detection instruction implemented in the correlator is used to find the 'n' highest peaks within any locally specified region (e.g., quadrants of the field of view). The coordinates from the peak detector indicate the most correlatable regions.

Referring to FIG. 4, this function is mechanized by performing a correlation on the mask bits of the live scene. RAM 32 is selected to output mask bits (in the same manner as required to update cell reference masks). The data selector 16 aligns data as previously described and outputs it to the convolver and summer 10. Register 40 stacks the mask bits into the 8×8 cell configuration for the 64 bit convolution. For mask accumulation, the reference register 42 is cleared to zero allowing the mask bits to be compared against zero ('0' being the state of an unmasked pixel) and the mask register 44 is cleared to zero representing no masked pixels in the convolution. The output of gate 19 is a '1' for every unmasked pixel and the output of summer 23 is the number of unmasked pixels within an 8×8 pixel region or cell. If the 8 x 8 region is swept over the entire video field, arithmetic unit 24 will build a two dimensional surface of unmasked pixel values indicating correlatability within the field of view.

It should be understood that while this invention has been described in connection with a particular example thereof, that those skilled in the art can appreciate that other modifications can be made without departing from the spirit of this invention after having the benefit of being able to study the drawings, specification and following claims.

What is claimed is:

1. In a method of correlating two input signals associated with a live image and a reference image, the improvement which includes the steps of:
   (a) processing at least the reference image associated signal to provide a polarity bit and a mask bit for each pixel position therein, the value of the mask bit being one digital state defining an off condition if the amplitude of the signal falls between two preselected threshold levels thereby substantially filtering out noisy pixels with amplitudes between the two threshold levels, and being of an opposite state defining an on condition if the amplitude is outside of the threshold levels, the value of the polarity bit being one digital state if the amplitude is positive with respect to a predetermined reference level and being of an opposite state if the amplitude is negative with respect to a predetermined reference level at that pixel position; and
   (b) using the polarity and mask bits of the processed reference signal to generate a correlation output wherein the pixel positions with a mask bit in the on condition are used in the correlation while the pixel positions with a mask bit in the off condition are not used in the correlation process, thereby producing a correlation output that is minimally affected by noise in the input signal.

2. The method of claim wherein step (b) includes measuring the density of mask bits defining the on condition; and
   using those regions in the reference image with the highest density of such mask bits to correlate against the live image.

3. The method of claim 1 wherein a signal representing a live image is also similarly processed, with step (b) including the step of logically gating the polarity bits of the processed reference and live signals, and using the output thereof to generate a correlation function unless masked by associated mask bits in the off condition.

4. The method of claim 3 wherein the polarity bits are gated in an EXCLUSIVE-OR gate.

5. The method of claim 4 wherein the output of the EXCLUSIVE-OR gate is coupled to an input of a NOR gate, another input of the NOR gate being coupled for receipt of the mask bit of the reference signal.

6. The method of claim 5 wherein the output of the NOR gate is coupled to a summer for summing the number of logical ones from the NOR gate, the output of the summer providing an output which will peak when the live image is correlated with the reference image.

7. A method of correlating two gradient image signals associated with a live image and a reference image, the method comprising the steps of:
   (a) processing the reference gradient image associated signal to provide a polarity bit and mask bit for each pixel position in the reference image, the value of the mask bit being of one digital state defining an off condition if the amplitude of the signal falls between two preselected threshold levels, thereby substantially filtering out noisy pixels with amplitudes between the two threshold levels and being an opposite state defining an on condition if the amplitude is outside of the threshold levels, the value of the polarity bit being one digital state if the amplitude is positive with respect to a predetermined reference level and being of an opposite state if the amplitude is negative with respect to a predetermined reference level at that pixel position;
   (b) processing the live gradient image associated signal to provide a polarity bit and a mask bit for each pixel position in the live image, the value of the mask bit being one digital state defining an off condition if the amplitude of the signal falls between two preselected threshold levels, thereby substantially filtering out noisy pixels with amplitudes between the two threshold levels and being of an opposite state defining an on condition if the amplitude is outside of the threshold levels, the value of the polarity bit being one digital state if the amplitude is positive with respect to a predetermined reference level and being assigned an opposite state if the amplitude is negative with respect to a predetermined reference level at that pixel position; and (c) using the polarity bits and mask bits of the processed reference and live images to generate a correlation function wherein the pixel positions with a mask bit in the on condition are used in the correlation while the pixel positions with a mask bit in the off condition are not used in the correlation process thereby producing a correlation output that is minimally affected by noise in the input signals.

8. The method of claim 7 wherein step (c) includes the step of logically gating the polarity bits of the processed reference and live images while ignoring the result if the associated mask bit in the reference image defines said off condition.

9. The method of claim 8 wherein the polarity bits are gated in an EXCLUSIVE-OR gate.

10. THe method of claim 9 wherein the output of the EXCLUSIVE-OR gate is coupled to an input of a NOR gate, another input of the NOR gate being coupled for receipt of the mask bit of the processed reference image.

11. The method of claim 10 wherein the output of the NOR gate is coupled to a summer for summing the number of logical ones from the NOR gate, the output of the summer providing an output which will peak when the live image is correlated with the reference image.

12. In an apparatus for correlating two input signals associated with a live image and a reference image, the improvement comprising:

(a) first means for processing at least the reference image associated signal to provide a polarity bit and a mask bit for each pixel position therein, the value of the mask bit being one digital state defining an off condition of the amplitude of the signal falls between two preselected threshold levels, thereby substantially filtering out noisy pixels with amplitudes between the two threshold levels, and being of an opposite state defining an on condition if the amplitude is outside the threshold levels, the value of the polarity bit being one digital state if the amplitude is positive with respect to a predetermined reference level and being of an opposite state if the amplitude is negative with respect to a predetermined reference level at that pixel position; and (b) second means for using the polarity and mark bits of the processed reference signal to generate a correlation output wherein the pixel positions with a mask bit in the on condition are used in the correlation while the pixel positions with a mask bit in the off condition are not used in the correlation process thereby producing a correlation output that is minimally affected by noise in the input signal.

13. The apparatus of claim 12 which further comprises:

means for measuring the density of mask bits defining the on condition; and means for using those regions in the reference image with the highest density of such mask bits to correlate against the live image.

14. The apparatus of claim 12 wherein the means for processing also similarly processes the live image; and wherein the second means logically gates the polarity bits of the processed reference and live signals to provide an output, the output being used to generate a correlation function unless masked by associated mask bits in the off condition.

15. The apparatus of claim 14 wherein an exclusive-OR gate is used to gate the polarity bits.

16. The apparatus of claim 15 wherein an output of the exclusive-OR gate is coupled to an input of a NOR gate, another input of the NOR gate being coupled for receipt of the mask bit of the reference signal.

17. The apparatus of claim 16 wherein an output of the NOR gate is coupled to a summer for summing the number of logical ones from the NOR gate, the output of the summer providing an output which will peak when the live image is correlated with the reference image.

18. A bilevel correlator for correlating an input signal associated with a live image and an input signal associated with a reference image of a scene, said bilevel correlator comprising:

means for defining a mean gradient amplitude for the scene;

positive threshold value means for defining a positive threshold value above the means gradient amplitude;

negative threshold value means for defining a negative threshold value below the means gradient amplitude;

preprocessing means for generating a polarity bit and a mask bit for each pixel position in the reference image, the value of the polarity bit being a logical one if the amplitude of the reference image input signal is above the means gradient amplitude and being a logical zero value if the amplitude of the input signal is below the means gradient amplitude, said preprocessing means also providing the mask bit with a value of zero if the amplitude of the input signal falls between said positive threshold value and the negative threshold value, with the value of the mask bit being a logical one if the amplitude of the input signal is above the positive threshold value or below the negative threshold value;

said preprocessing means further generating a polarity bit and a mask bit for each pixel position in the live image, the value of the polarity bit being a logical one if the amplitude of the live image input signal is above the means gradient amplitude and being a logical zero value if the amplitude of the input signal is below the mean gradient amplitude, said preprocessing means also providing the mask bit with a value of zero if the amplitude of the input signal falls between said positive threshold value and the negative threshold value, with the value of the mask bit being a logical one if the amplitude of the input signal is above the positive threshold value or below the negative threshold value;

gating means for generating a logical output signal as a function of a comparison of the polarity bits for given pixel positions of the reference and live images;

means for masking said logical output signal if the mask bit for the given pixel position is a logical zero thereby indicating that the amplitude of the input signal at that pixel position is relatively small; and summation means or summing together the unmasked logical output signals of the gating means to provide a correlation function that is minimally affected by noise in the input signal.

* * * * *

UNITED STATES PATENT AND TRADEMARK OFFICE
CERTIFICATE OF CORRECTION

PATENT NO. : 5,020,113

DATED : May 28, 1991

INVENTOR(S) : T.K. Lo, J.M. Sacks, W.P. Simoni, L.A. Lee
H. Nguyen, L.M. Karlin, A.L. Quan, K.R. Hosokawa It is certified that error appears in the above-identified patent and that said Letters Patent is hereby corrected as shown below:

In printed Claim 18:

Column 10, line 24, instead of "means" insert --mean--;

Column 10, line 27, instead of "means" insert --mean--;

Column 10, line 33, instead of "means" insert --mean--;

Column 10, line 35, instead of "means" insert --mean--;

Column 10, line 46, instead of "means" insert --mean--.

Signed and Sealed this

Twenty-ninth Day of September, 1992

Attest:

DOUGLAS B. COMER

Attesting Officer     Acting Commissioner of Patents and Trademarks